United States Patent [19]
Ishida

[11] Patent Number: 6,115,582
[45] Date of Patent: Sep. 5, 2000

[54] RADIO SELECTIVE-CALLING RECEIVER

[75] Inventor: Takayasu Ishida, Shizuoka, Japan

[73] Assignee: NEC Corporation, Tokyo, Japan

[21] Appl. No.: 08/905,643

[22] Filed: Aug. 4, 1997

[30] Foreign Application Priority Data

Aug. 2, 1996 [JP] Japan ................................ 8-205015

[51] Int. Cl.[7] ............................................ H04B 7/00
[52] U.S. Cl. .................... 455/38.3; 455/161.1; 455/502
[58] Field of Search ........................ 455/38.3, 151.1, 455/161.1, 502, 572, 343, 229; 370/311.1, 313; 340/825.44, 825.04, 311.1, 823.03, 825.47

[56] References Cited

U.S. PATENT DOCUMENTS

| | | | |
|---|---|---|---|
| 5,032,835 | 7/1991 | DeLuca | 455/229 |
| 5,189,413 | 2/1993 | Gaskill et al. . | |
| 5,355,518 | 10/1994 | Kindinger et al. | 455/229 |
| 5,416,827 | 5/1995 | Gaskill . | |
| 5,627,882 | 5/1997 | Chien et al. | 455/38.3 |
| 5,740,517 | 4/1998 | Aoshima | 455/38.3 |

FOREIGN PATENT DOCUMENTS 1-93221   4/1989   Japan .

*Primary Examiner*—Nguyen Vo
*Assistant Examiner*—Naghmeh Mehrpour
*Attorney, Agent, or Firm*—Scully, Scott, Murphy & Presser

[57] ABSTRACT

A radio selective calling receiver for bringing into possible to implement leading-in synchronization rapidly by performing rapid-scan by virtue of switch manipulation as a trigger in the receiver out of the service area. When receiving section exists out of the service area, the receiver implements auto-scan of reception frequency with definite cycle interval, while when the receiver enters the service area, the receiver implements leading-in synchronization automatically. The control section causes cycle of the auto-scan to change by switch manipulation out of the service area.

4 Claims, 6 Drawing Sheets

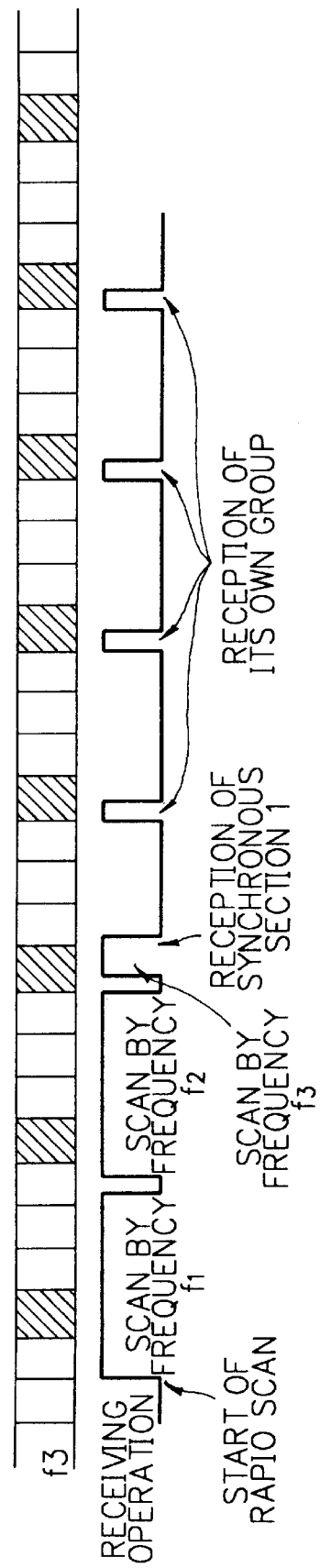

RADIO SELECTIVE-CALLING RECEIVER

BACKGROUND OF THE INVENTION

The present invention relates to a radio selective-calling receiver which is capable of implementing reception by auto-scan of frequency within a plurality of service areas.

DESCRIPTION OF THE RELATED ART

FIG. 1 is a signal format view showing constitution of ordinary radio signal and transmission state thereof. Signal is separated into several groups. Its own group of signal is transmitted with definite cycle. FIG. 1 shows that its own group is transmitted in every four times. Its own group is denoted by black in the signal row. The receiver is separated into required groups when calling number is written thereinto. Radio signal length of one group is determined. When it takes synchronization of the signal therebetween once (when synchronization section 1 is received), it permits only its own group of radio signals to receive because it is capable of detecting the timing of its own group of the radio signals. Thus battery saving operation is performed. In signal format of FIG. 1, S1 is synchronization section 1, FI is frame information, S2 is synchronization section 2, BI is block information, AF is address field, VF is vector field, MF is massage field, and IB is idle block.

FIG. 2 is a timing chart showing reception state when radio signal according to FIG. 1 is received.

When ordinary reception can be performed by virtue of strong electric field, it permits receiving operation to start after power supply being thrown. Radio signal which is transmitted at present is judged by reception of synchronous signal of another group. Receiving operation is repeated while performing battery saving operation from its next own group of radio signals. When there is received address field as its own group of radio signals, if no-own address exists, it causes receiving operation to stop at this point.

FIG. 3 is a timing chart showing the case where auto-scan of frequency is implemented in the former radio signal reception.

When its own group of radio signals can not be received by frequency f1 of the receiver which f1 is ordinarily used for reception of radio signal, auto-scan of frequency is started. In the auto-scan of frequency, it permits reception-frequency to change in order of the frequency of the frequency table of the receiver. Receiving operation is started when synchronous section 1 of its own group of radio signals is received due to the corresponding frequency. Ordinary frequency scan is implemented with definite interval of period for reducing consumption current.

Japanese Patent Application Laid-Open No. HEI 1-93221 discloses a former radio selective-calling receiver. A plurality of service areas are set to respective pagers as radio selective-calling receivers. In this receiver, switching of a plurality of service areas is capable of being performed by hand-operated action or automatic action. When switching of service areas is implemented by automatic action, a microprocessor judges whether or not a frequency, a signal speed, and a scheme of signal transmission agrees with the required value. In case of disagreement, there is changed the frequency, the signal speed, and the scheme of signal transmission into another group of a frequency, a signal speed, and a scheme of signal transmission. This switching operation is continued to detect corresponded group. In case of agreement, the receiver enters waiting state of reception.

Thus, there is auto-scan-function of frequency in the receiver with a plurality of service areas. When the receiver exists out of service area, scan of frequency is implemented with defined cycle, while when the receiver enters service area, a control of leading-in synchronization is implemented automatically.

However, in these radio selective calling receivers, in order to improve battery saving efficiency, cycle interval of the auto-scan is set to some degree long time. For this reason, although the receiver enters service area, there is a problem that it is incapable of implementing leading-in synchronization soon. For example, although it is the same service area, electric wave is interrupted to dedicate from synchronization by an obstruction such as an underground passage way, even if coming out on the ground, it is incapable of implementing leading-in synchronization soon. While it permits scan cycle at the time of out of service area to shorten in order to increase number of chance of leading-in synchronization to the contrary, there is problem that battery saving efficiency lowers.

SUMMARY OF THE INVENTION

In view of the foregoing, it is an object of the present invention to provide a radio selective-calling receiver which brings into possible to implement leading-in synchronization rapidly by performing rapid-scan with switch manipulation in the receiver as trigger without of service area, while within the service area, which brings into possible to implement leading-in synchronization rapidly by performing ordinary auto-scan, consequently, it is capable of improving battery saving efficiency except for shortening scan cycle.

According to a first aspect of the present invention, for achieving the above-mentioned objects, there is provided a radio selective-calling receiver which implements auto-scan of reception frequency with definite cycles when receiver exists out of a service area, while when said receiver enters the service area, it permits leading-in synchronization to implement automatically, which comprises a control section for changing cycle of the auto-scan by switch manipulation out of the service area.

According to a second aspect of the present invention, in the first aspect, the control section of the radio selective-calling receiver is provided with selective-input whether or not rapid-auto-scan is implemented when there is the switch manipulation out of the service area, and when there is switch input in terms of rapid-scan, it causes the rapid-scan to execute.

According to a third aspect of the present invention, in the second aspect, the control section of the radio selective calling receiver controls the number of times of the rapid-scan.

According to a fourth aspect of the present invention, in the second aspect, the control section of the radio selective calling receiver causes the auto-scan to resume after lapse of definite time when although number of times of rapid scan arrives at set number of times, leading-in synchronization is incapable of being implemented.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 6 is a timing chart showing frequency rapid-auto-scan in the radio signal reception according to the present invention.

DETAILED DESCRIPTION OF THE PREFERRED EMBODIMENTS

A preferred embodiment of the present invention will now be described in detail referring to the accompanying drawings.

Figure 1:
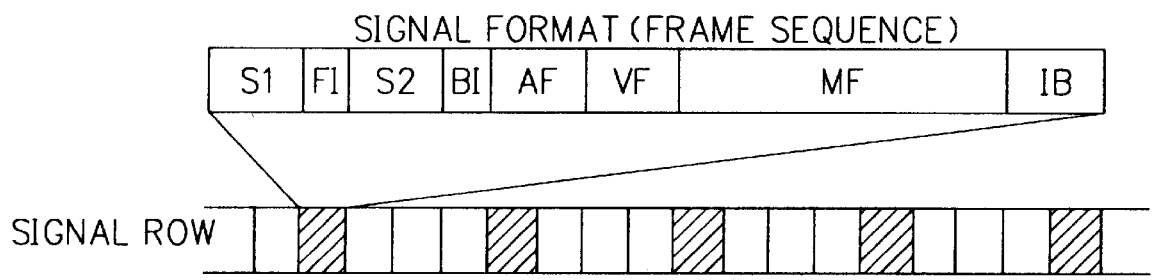
FIG. 1 is a signal format view showing constitution of ordinary radio signal and transmission state thereof.
Figure 2:
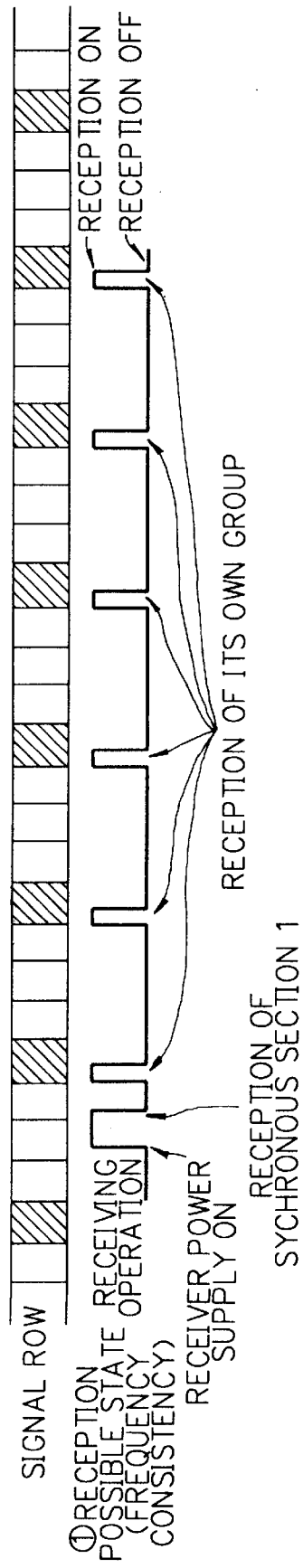
FIG. 2 is a timing chart showing reception state when radio signal according to FIG. 1 is received.
Figure 3:
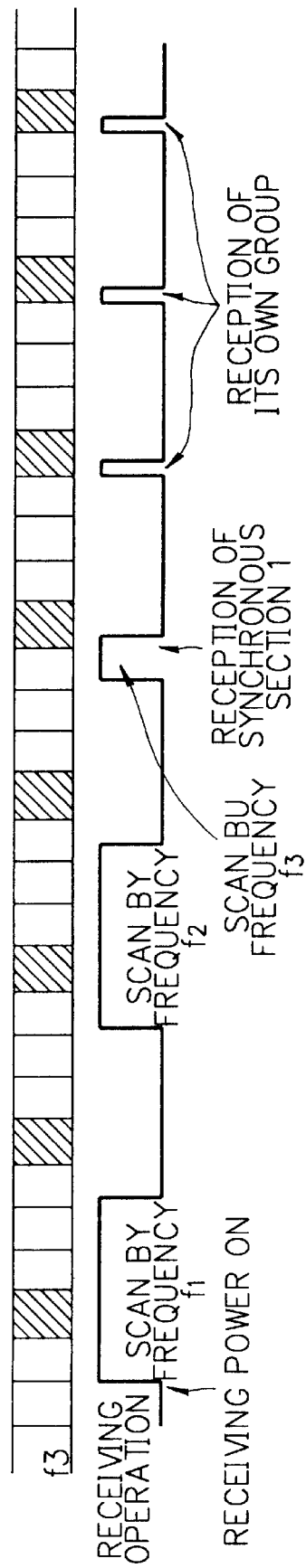
FIG. 3 is a timing chart showing frequency auto-scan in the conventional radio signal reception.
Figure 4:
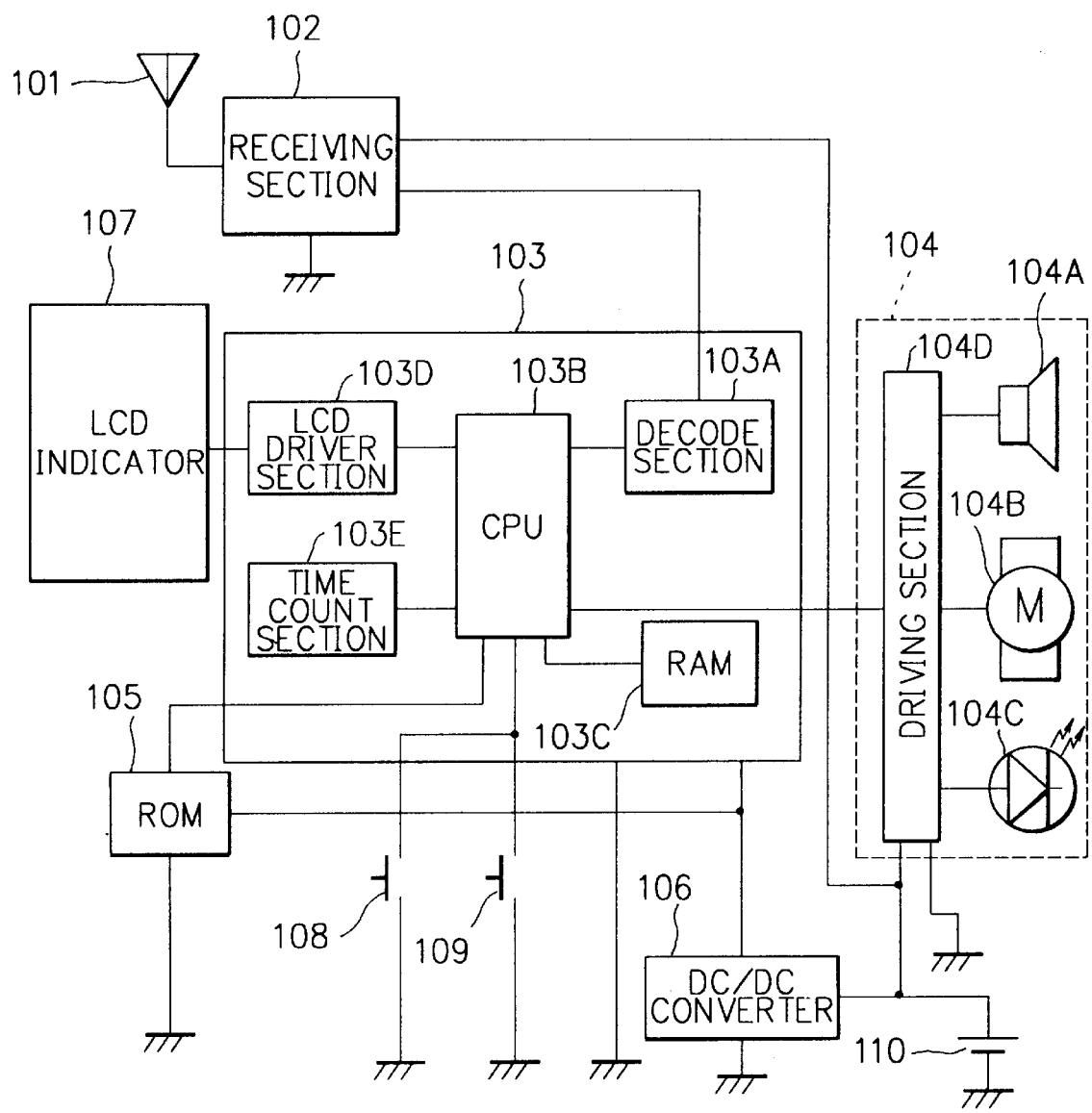
FIG. 4 is a block diagram showing a radio selective calling receiver according to the present invention.

FIG. 4 is a block diagram showing a radio selective calling receiver according to the present invention. The radio selective calling receiver comprises a receiving antenna 101, a receiving section 102 for receiving to amplify radio frequency signal inputted through the receiving antenna 101 before demodulating to output this signal, and control section 103 in which decoding section 103A for decoding the demodulated signal is provided therewith. Reference numeral 103B denotes microprocessor (hereinafter referring to CPU). Reference numeral 103C denotes a random access memory thereinafter referring to RAM) for temporarily storing reception data and so forth. In the control section 103, 103D denotes display drive section (hereinafter referring to LCD driver) for display-driving a liquid crystal display 107 as a display section under the control of the CPU 103B, and 103E denotes time counting section.

An informing section 104 comprises a speaker 104A, a vibrator 104B, a light-emitting device 104C, and a driving section 104D therefor. Reference numeral 105 denotes a read only memory (hereinafter referring to ROM) within which its own calling number of the receiver and so forth are written. Reference numeral 106 denotes a DC-to-DC converter for outputting direct-current voltage with required level using a power supply of battery 110, 107 denotes the liquid crystal display, 109 denotes a switch which is manipulated when synchronous signal is not verified, and 109 denotes a switch which is selected when rapid scan is implemented.

Figure 5:
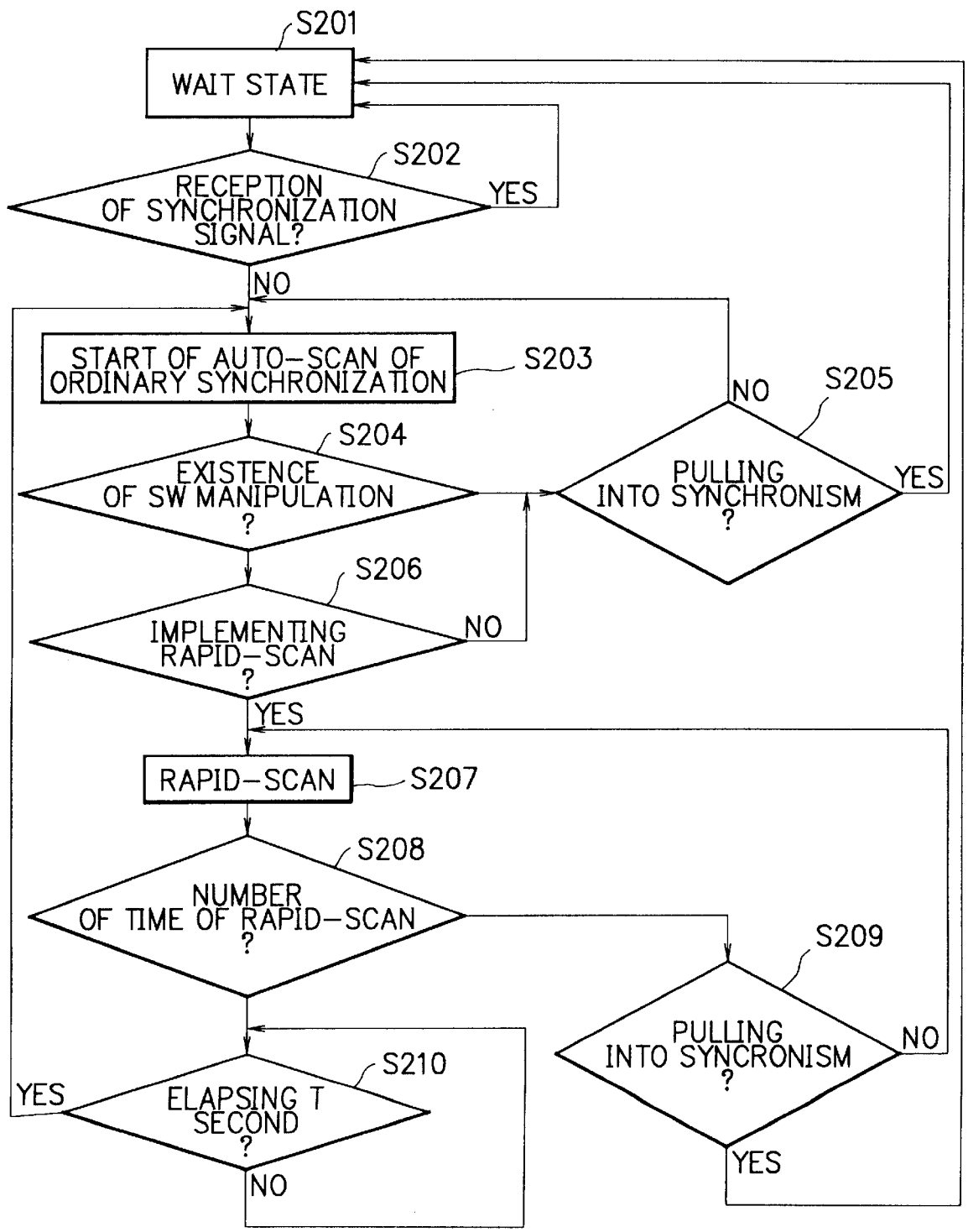
FIG. 5 is a flow chart showing flow of operation of the radio selective-calling receiver shown in FIG. 1.

Next, operation of the radio selective calling receiver will be described in accordance with flow chart of FIG. 5 and signal timing chart of FIG. 6. Power supply of the radio selective calling receiver is brought into on-state, thus proceeding to wait-state (STEP S201). Next, it takes in the signal received by the receiving antenna 101 within the receiving section 102. Amplification and demodulation of the signal are implemented. Decoding conversion is implemented at the decode section 103A, thus inputting to the CPU 103B. The signal processing is executed at the CPU 103B, thus judging whether or not synchronous signal (referring to as SC hereinafter) is incorporated (STEP S202). When SC is received, it comes into wait-state. While, when SC is not received, receiving operation is implemented in order with predetermined cycle in terms of another area setting which is stored within the ROM 105 (STEP S203). At this time, the CPU 103B monitors whether or not there is manipulation of the switch 108 (STEP S204). When there is no manipulation of the switch 108, examination of SC is implemented. When SC is not received, auto scan of normal cycle is maintained, while when SC is received, thus becoming wait-state (STEP S205).

FIG. 6 is signal timing chart showing rapid-auto-scan when signal is incapable of being received. When rapid-scan is implemented by switch manipulation, cycle interval of frequency scan is shortened. The number of rapid-scan is counted by the CPU. When synchronous section can not be received after repeating the scan within determined number of times, the rapid-scan is stopped. The reason why it causes the rapid scan to stop within the determined number of times, because consumption amount of battery is increased due to long receiving operation.

When there is manipulation of the switch 108, it becomes waiting of selective-input whether or not rapid-scan is implemented (STEP S206). At this time, when the rapid-scan is not selected by manipulation of the switch 109, auto-scan of the normal cycle interval is maintained. While when the rapid scan is selected, it permits the rapid scan to implement (STEP S207). When the rapid scan is implemented, the CPU 103B counts number of the rapid scan (STEP S208). If the number of times of the rapid scan is within predetermined number, implementing rapid scan to SC reception (STEP S209). If SC-reception is incapable of being received during determined number of times, it permits auto scan operation to inhibit during predetermined t seconds (STEP S210). Put another way, although switch manipulation is implemented, it is not proceeded for the setting manipulation during determined time after termination of the setting manipulation.

As stated above, according to the present invention, when the receiver exists out of the service area, it permit auto-scan of fixed cycle interval of reception frequency to implement, so that when the receiver enters the service area, thus performing leading-in synchronization automatically. Since there is constituted that the control section causes cycle interval of the auto-scan to change by switch manipulation out of the service area, it becomes possible to lead-in synchronization rapidly by implementing rapid-scan with switch manipulation as a trigger in the receiver, while within the service area, it becomes possible to lead-in synchronization by ordinary auto-scan. Consequently, exception for shortening scan-cycle interval, there is obtained the effect that it is capable of improving the efficiency of battery saving.

Furthermore, according to the present invention, it permits selective-input whether or not the rapid-scan is implemented to possess to the control section when the switch manipulation is performed out of the service area, when it exists switch input of the rapid-scan, it causes the rapid-scan to execute, whereby change of state from continuation of normal cycle interval of auto scan to the rapid-scan is implemented with confirming thereof exception for error.

Moreover, according to the present invention, since the control section causes the number of times for the rapid scan to control, it is capable of staying exhaustion of the battery with the irreducible minimum of a necessity.

Moreover, according to the present invention, since there is constituted that the control section causes the auto-scan to resume after lapse of fixed time, when leading-in synchronization is not performed although the rapid-scan arrives at set number of times, there is obtained the effect that the auto-scan within the service area is capable of continuing with the battery saving performed after failing of the rapid-scan.

While preferred embodiments of the invention have been described using specific terms, such description is for illustrative purpose only, and it is to be understood that chanbes and variations may be made without departing from the spirit or scope of the following claims.

What is claimed is:

1. A radio selective calling receiver which implements auto-scan of reception frequency with fixed cycle of interval when receiver exists out of a service area, while when said receiver enters the service area, it permits leading-in synchronization to implement automatically, comprising:

a control section for changing cycle interval of said auto-scan by switch manipulation out of service area.

2. A radio selective calling receiver according to claim 1, wherein said control section of said radio selective-calling receiver is provided with selective-input whether or not rapid-auto-scan is implemented when there is the switch manipulation out of the service area, and when there is switch input in terms of rapid-scan, it causes the rapid-scan to execute.

3. A radio selective calling receiver according to claim 2, wherein said control section controls the number of times of said rapid-scan.

4. A radio selective calling receiver according to claim 2, wherein said control section causes the auto-scan to resume after lapse of definite time when although number of times of rapid scan arrives at set number of times, leading-in synchronization is not implemented.

* * * * *

UNITED STATES PATENT AND TRADEMARK OFFICE
CERTIFICATE OF CORRECTION

PATENT NO. : 6,115,582
DATED : September 5, 2000
INVENTOR(S) : T. Ishida

It is certified that error appears in the above-identified patent and that said Letters Patent is hereby corrected as shown below:

Column 5, claim 1,
Line 6, "automatically comprising" should read -- automatically
at a reception frequency with a fixed cycle interval that is smaller than the interval implemented out of the service area --
Line 8, "...area." should read -- area, wherein any delay relating
to said fixed cycle interval lead in synchronization is automatically decreased relative the decreased fixed cycle interval when the receiver enters the service area. --

Signed and Sealed this

Twelfth Day of March, 2002

Attest:

JAMES E. ROGAN
Attesting Officer
Director of the United States Patent and Trademark Office